June 22, 1948.  A. F. SHAFTER  2,443,806
ELECTRIC FOOD WARMER
Filed Nov. 9, 1945  3 Sheets-Sheet 1
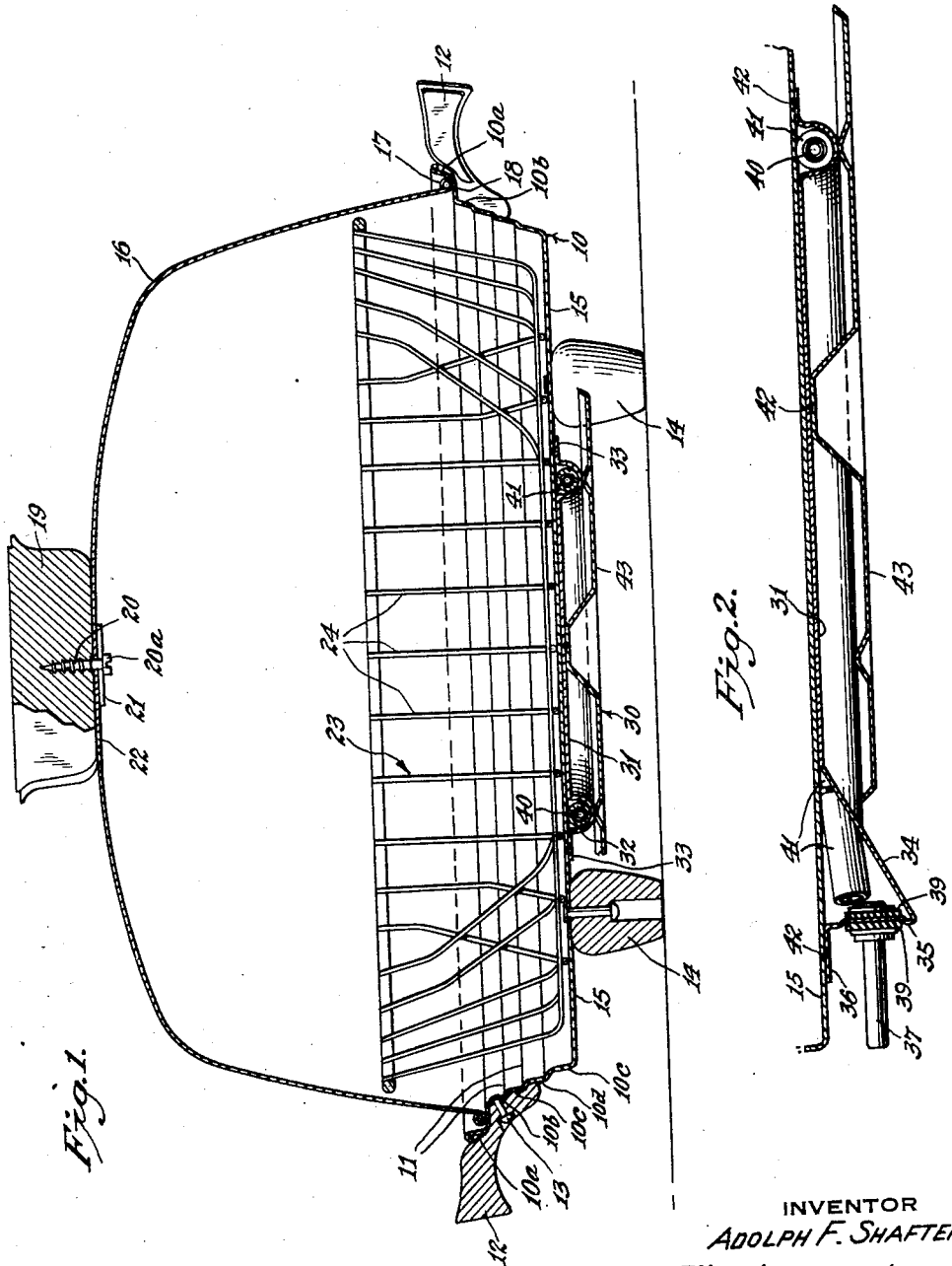
INVENTOR
ADOLPH F. SHAFTER
BY
ATTORNEYS June 22, 1948.    A. F. SHAFTER    2,443,806
ELECTRIC FOOD WARMER
Filed Nov. 9, 1945    3 Sheets-Sheet 2

INVENTOR
ADOLPH F. SHAFTER
BY
ATTORNEYS

June 22, 1948.　　　A. F. SHAFTER　　　2,443,806
ELECTRIC FOOD WARMER
Filed Nov. 9, 1945　　　　　　　　　　3 Sheets-Sheet 3

INVENTOR
ADOLPH F. SHAFTER
BY Kenyon & Kenyon
ATTORNEYS

Patented June 22, 1948

2,443,806

UNITED STATES PATENT OFFICE 2,443,806

ELECTRIC FOOD WARMER

Adolph F. Shafter, Decatur, Ill., assignor to U. S. Manufacturing Corporation, Decatur, Ill., a corporation of Illinois Application November 9, 1945, Serial No. 627,652

3 Claims. (Cl. 219—44)

This invention relates to food warmers, and more particularly to devices of this kind utilizing electric heat for warming up biscuits, buns, rolls or the like either in the kitchen or at the table.

An object of this invention is to provide food warmers of this character that are simple and efficient in operation.

A further object of the invention is to provide food warmers of this character that may be used effectively either to warm fresh, moist products or staler food products.

Yet another object of the invention is to provide efficient and effective electrical heating means for the food warmer.

And a further object of the invention is to provide food warmers that may be simply and economically manufactured.

To the accomplishment of the foregoing and such other objects as may hereinafter appear, this invention consists in the novel construction and arrangement of parts hereinafter to be described and then sought to be defined in the appended claims, reference being had to the accompanying drawing forming a part hereof, which shows merely for the purposes of illustrative disclosure preferred embodiments of the invention, it being expressly understood, however, that changes may be made in practice within the scope of the claims, without digressing from the inventive idea.

In the drawings:

Fig. 1 is a vertical section of the food warmer;

Fig. 2 is a section taken along line 2—2 of Fig. 3, illustrating details of heating unit construction;

Figure 3:
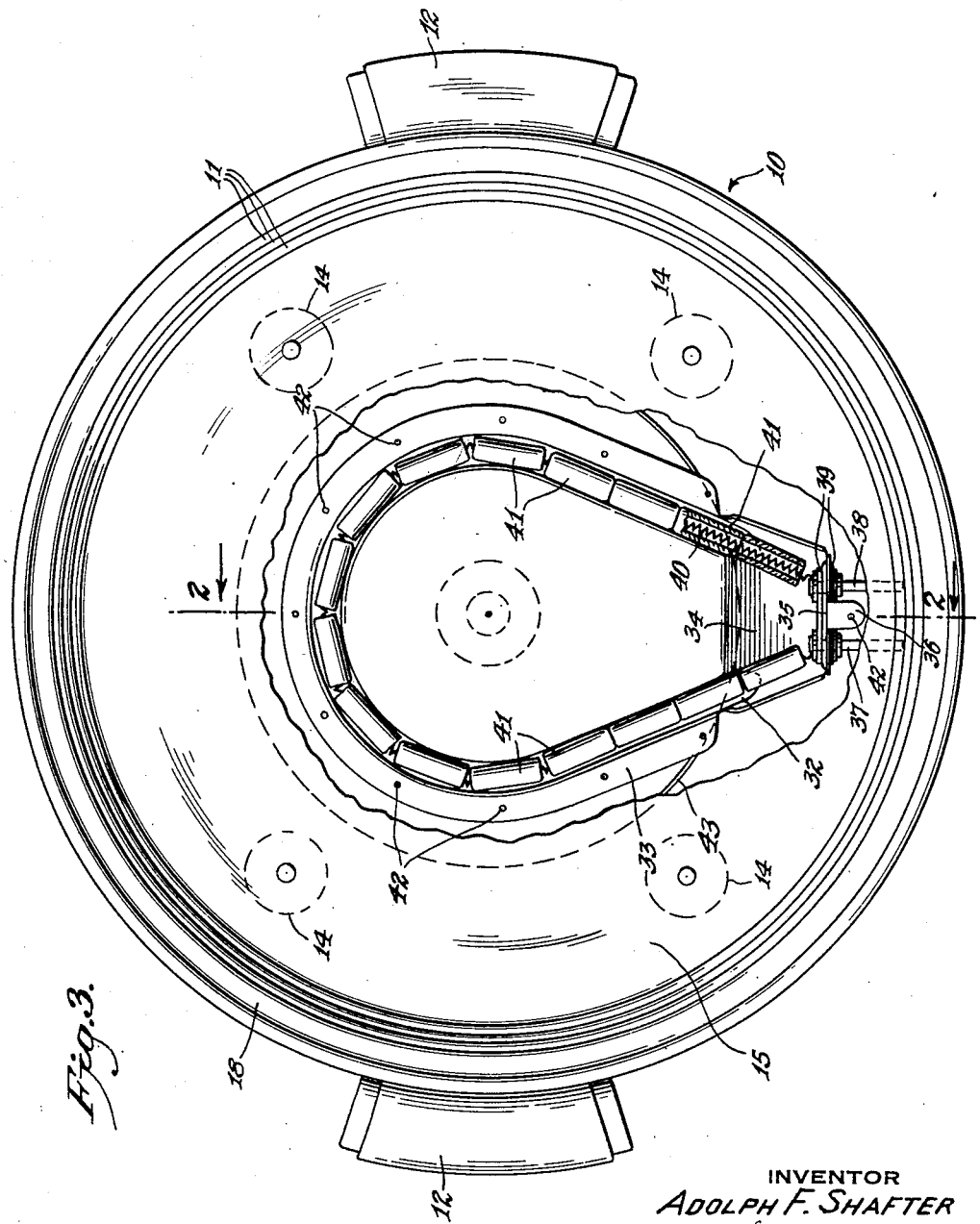
Fig. 3 is a top plan view of the device of Fig. 1 with the cover removed and the bottom broken away in part.

Referring to the drawing and first to Figs. 1-3 inc., 10 denotes a comparatively shallow pan or receptacle provided in its depth with portions 10a, 10b, 10c, etc., of successively reduced diameter so that in section the pan is ribbed at 11 and has inverted frusto-conical section. The ribbing 11 serves as reinforcement and adds decorative effects to the surface appearance of the pan. Carrying handles 12 are secured suitably at 13 to the side wall of the pan at substantially diametrically opposite points. These handles are preferably of heat-resisting plastic composition, but may be of other materials such as wood or the like. Suitable feet 14 of the same material are secured to the bottom 15 of the pan 10.

A deep cover or lid 16 is provided for the tray or pan 10. This cover has inverted cup shape and is admeasured in diameter so that its beaded rim or edge 17 is removably supportable on the shoulder 18 formed between the portions 10a and 10b of the pan 10. A handle 19 preferably of the same material as handles 12 is secured to the cover 16 at its top, for example, by the screw 20, the washer 21 being interposed between the head 20a of the screw and the inner surface of cover 16 to permit rotation of the handle relative to the cover so that an opening or hole 22 in the cover may be exposed in one position of the handle 19 and closed by the handle in another of its positions.

A removable basket 23 formed preferably of widely spaced intermeshed or interwoven wire rods 24 or the like is provided. This basket 23 has the general outward configuration of an inverted frustrum of a cone and its bottom rests upon the upper surface of the pan bottom 15.

An electric heating unit 30 is secured to the underface of the bottom 15. This unit 30 comprises a platelike member 31 that is provided with a channel or groove 32 of substantially U-section. The groove extends substantially parallel with the periphery of the plate-like member for a major portion thereof defining a peripheral flange 33.

A portion 34 of the member 31 is bent downwardly at an angle with the surface of the member 31. An adjoining portion 35 is bent up at substantially right angles with the surface of member 31 and an adjoining portion 36 is bent to lie parallel with and in the same plane as the flange 33. The vertical portion 35 serves as a mounting wall for the electric contacts or prongs 37, 38, the latter being secured suitably thereto but insulated electrically therefrom and from each other by the insulation 39.

An electric heating coil 40 is adapted to be carried in the groove 32. This heating coil 40 is insulatively supported in the groove by a plurality of insulating tubes 41 of short length. These tubes 41 preferably are of porcelain or other heat resisting, electrically non-conductive or insulating material. The said tubes 41 each have comparatively short length and are admeasured in exterial diameter and in length so that when threaded onto the heating coil 40, the assembly readily accommodates itself to lie within the groove 32. The opposite ends of the heating coil 40 are secured to the respective prongs 37, 38 to make good electrical contact therewith in any conventional way.

The plate member 31 bearing the heating coil 40 surrounded by tubes 41 is secured to the underface of the pan bottom 15 as by spot welding at 42 of the flanges 33 and 36 thereby completely enclosing the heating coil 40 and rendering it inaccessible for tampering or damage. An additional protective plate 43 is secured to the plate member 31 and serves to reduce the heat radiated downwardly from the coil 40 to a minimum rendering it safe to place the warmer on the surface of a table, the legs 14 of course being of sufficient height to render this possible.

Figure 4:
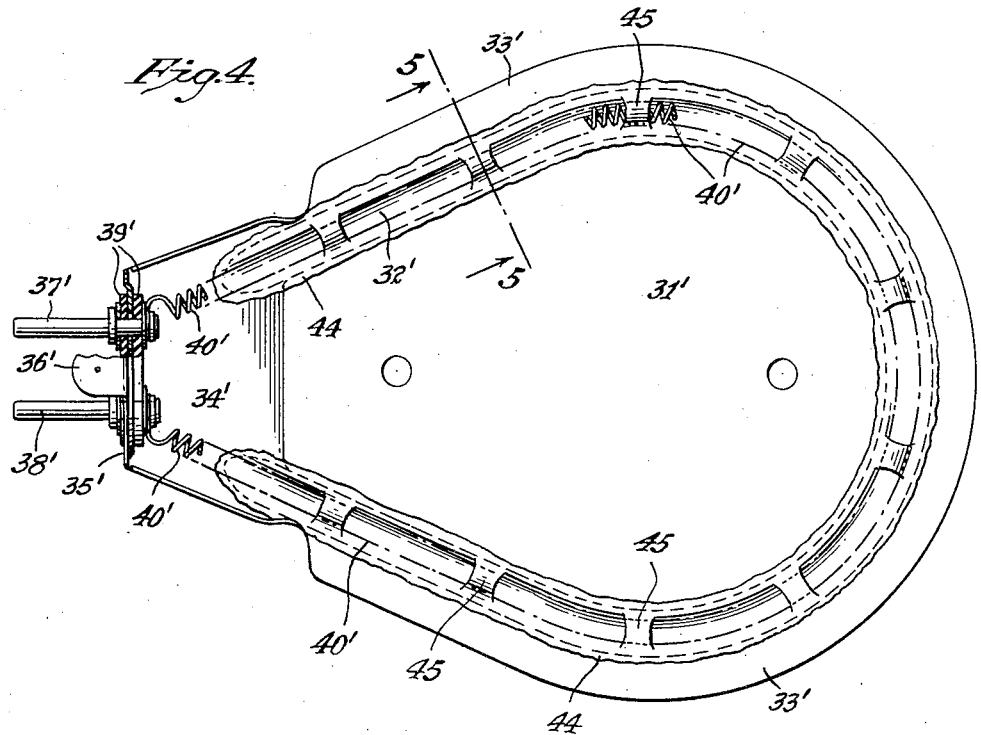
Fig. 4 is a top plan view partially broken away and in section of a modified form of heating unit.
Figure 5:
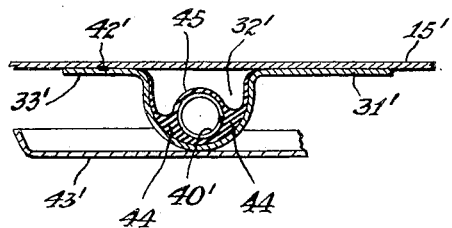
Fig. 5 is a section taken along line 5—5 of Fig. 4.

A modified means for mounting the heating coil in the groove of the plate member is shown in Figs. 4 and 5. Therein all parts having primed reference characters are identical with parts similarly numbered but unprimed in Figs. 1–3. The coil 40' is supported in the groove 32' in insulated relationship thereto without the use of tubes 41. Instead, a bed 44 of insulating material is applied to the bottom of the groove 32'. This insulating material is of the type that may be applied in plastic form and has the property of setting into a solid mass, for example, asbestos cement. While in plastic form the coil 40' is partially embedded in the bed 44 without touching the bottom of the groove 32'. At selected intervals along the upper unexposed coil surface, bridging portions 45 of the bed material are applied in plastic form while the bed material also is in plastic form. When the material sets, these overlying bridging portions 45 maintain the coil firmly on the bed 44 while leaving the upper surface of coil 40' substantially exposed in its major area so that a maximum of the heat developed by the coil is delivered upwardly toward the plate bottom 15'. The groove 32' is of sufficient depth to insure the fact that the exposed upper surface of the coil 40' lies well below the under surface of the plate bottom 15' avoiding all electrical contact therewith and being so maintained by the bridging members 45.

The member 31' with its so supported coil 40' is secured to the bottom 15' in identically the same way as member 31 is secured to bottom 15.

When either of the heating elements described is used, the rolls or the other food are placed in basket 23 and the latter mounted in the pan 10. The cover 16 is applied and the electric current connected to the heating coil 40 or 40'. If the rolls are fresh the handle 19 of the cover is turned to expose opening 22 so that steam generated from moisture in the rolls or other food in the basket can escape. On the other hand, if the food placed in the basket is stale, the handle 19 is rotated to close the opening 22. Thus whatever steam may be developed by such food being warmed is retained within the cover 16 preventing excess drying of the warmed food.

While specific embodiments of the invention have been disclosed, it is to be understood that variations in structural detail are possible and are contemplated. There is no intention, therefore, of limitation to the exact details of structure described and shown.

What is claimed is:

1. In a food warmer or the like, a receptacle for food or the like, a removable cover, and electrical heating means supported from the underface of said receptacle, said heating means comprising a plate-like member having a groove of substantially U-section extending substantially parallel with the periphery of said plate-like member and spaced therefrom to define a peripheral flange, said plate-like member also having a terminal supporting portion and a flange on said terminal supporting portion lying in substantially the same plane as said first-named flange, said flanges being secured directly and permanently to said underface of said receptacle, a heating coil, insulating means within said groove for supporting said coil within said groove in insulated relationship relative to the groove walls and the said underface, a protective member secured directly to said plate-like member below said coil for reducing heat radiated downwardly from said heating coil, and electrical terminals to which opposite ends of said coil are connected, said terminals being insulatively supported from the terminal supporting portion of said plate-like member.

2. In a food warmer or the like, a receptacle for food or the like, a removable cover, and electrical heating means supported from the underface of said receptacle, said heating means comprising a plate-like member having a groove of substantially U-section extending substantially parallel with the periphery of said plate-like member for a major portion thereof and spaced therefrom to define a peripheral flange, said plate-like member also having a terminal supporting portion and a flange on such terminal supporting portion lying in substantially the same plane as said first-named flange, said flanges being secured permanently to said underface of said receptacle, a plurality of tubular members of electric insulating material carried in said groove, an electric heating coil threaded through said tubular members, said tubular members serving to electrically insulate said coil from said plate-like member in said groove and from said underface of said receptacle, a protective member secured directly to said plate-like member for reducing heat radiated downwardly from said heating coil, and electrical terminals to which opposite ends of said coil are connected, said terminals being insulatively supported from the terminal supporting portion of said plate-like member.

3. In a food warmer or the like, a receptacle for food or the like, a removable cover, and electrical heating means supported from the underface of said receptacle, said heating means comprising a plate-like member having a groove of susbtantially U-section extending substantially parallel with the periphery of said plate-like member and spaced therefrom to define a peripheral flange, said plate-like member also having a terminal supporting portion and a flange on said terminal supporting portion lying in substantially the same plane as said first-named flange, said flanges being secured directly and permanently to said underface of said receptacle, an electrical heating coil within said groove, electrical insulating material within said groove in its bottom and along its side walls partially embedding said coil but leaving its upper surface exposed, bridging members of the same insulating material overlying portions of the exposed surface of said coil and integral with the embedding portions thereof, said insulating material serving to maintain said coil electrically insulated from said plate-like member and out of electrical contact with the said underface of said receptacle, a protective member secured directly to said plate-like member below said coil for reducing heat radiated downwardly thereby, and electrical terminals to which opposite ends of said coil are connected, said terminals being insulatively supported from the terminal portion of said plate-like member.

ADOLPH F. SHAFTER.

REFERENCES CITED

The following references are of record in the file of this patent:

UNITED STATES PATENTS

| Number | Name | Date |
|---|---|---|
| 493,422 | Capek | Mar. 14, 1893 |
| 596,160 | Helberger | Dec. 28, 1897 |
| 910,479 | Andrews | Jan. 19, 1909 |
| 1,474,723 | Levinson | Nov. 20, 1923 |
| 1,540,178 | Moegling | June 2, 1925 |
| 1,564,681 | Kercher | Dec. 8, 1925 |
| 1,650,999 | Preston | Nov. 29, 1927 |
| 1,711,406 | Drumm | Apr. 30, 1929 |
| 1,806,512 | Wiegand | May 19, 1931 |
| 1,820,514 | Waller | Aug. 25, 1931 |
| 1,975,464 | Juengst et al. | Oct. 2, 1934 |
| 2,189,127 | Brannon | Feb. 6, 1940 |
| 2,217,296 | Shaw | Oct. 8, 1940 |
| 2,226,437 | McCullough | Dec. 24, 1940 |
| 2,230,488 | Gough | Feb. 4, 1941 |
| 2,235,911 | Wilcox | Mar. 25, 1941 |